US005764475A

United States Patent [19]

LeVander

[11] Patent Number: 5,764,475
[45] Date of Patent: Jun. 9, 1998

[54] CARRYING CASE FOR A MOBILE OFFICE SYSTEM

[76] Inventor: Mark R. LeVander, 37 Douglas Ave., Stamford, Conn. 06906

[21] Appl. No.: 767,148

[22] Filed: Dec. 16, 1996

[51] Int. Cl.⁶ .................. G06F 1/16; H05K 7/02
[52] U.S. Cl. .................................................. 361/683
[58] Field of Search ........................ 190/100, 900; 364/708.1; 361/683

[56] References Cited

U.S. PATENT DOCUMENTS 4,790,431  12/1988  Reel et al. ................... 206/305
4,837,590  6/1989  Sprague ..................... 361/683 X
4,896,776  1/1990  Kabanuk et al. ............. 206/576
5,552,957  9/1996  Brown et al. ................ 361/683
5,717,567  2/1998  Tao ......................... 361/683

Primary Examiner—Michael W. Phillip
Attorney, Agent, or Firm—St. Onge Steward Johnston & Reens LLC

[57] ABSTRACT

A rectangular shaped carrying case for a laptop computer and a portable top loading printer. The base of the case has a slot for exiting printed paper from the printer in front while the computer and printer are positioned side-by-side facing forward. A padded compartment section separates the computer from the printer and houses a stapler. The back of the case lid has various compartments for office accessories.

9 Claims, 2 Drawing Sheets

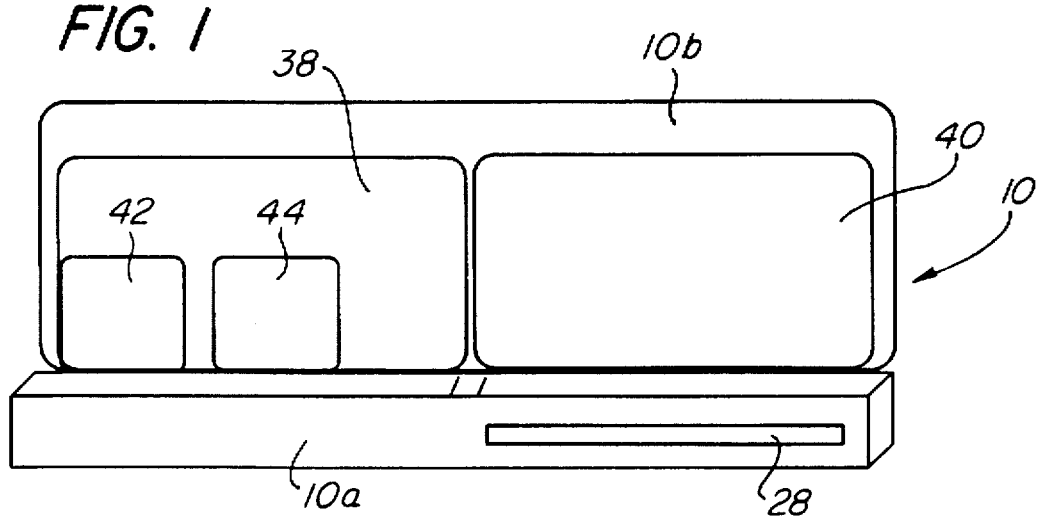
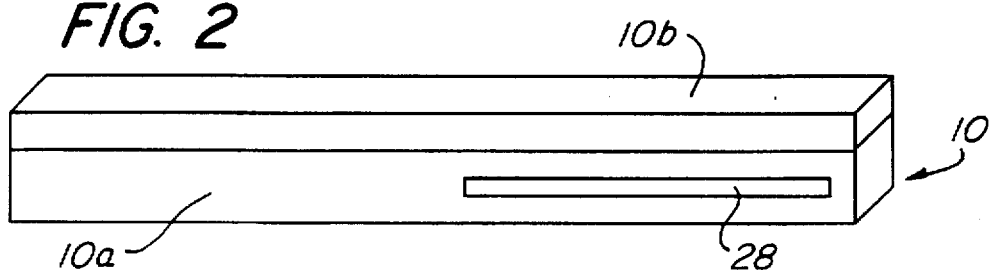
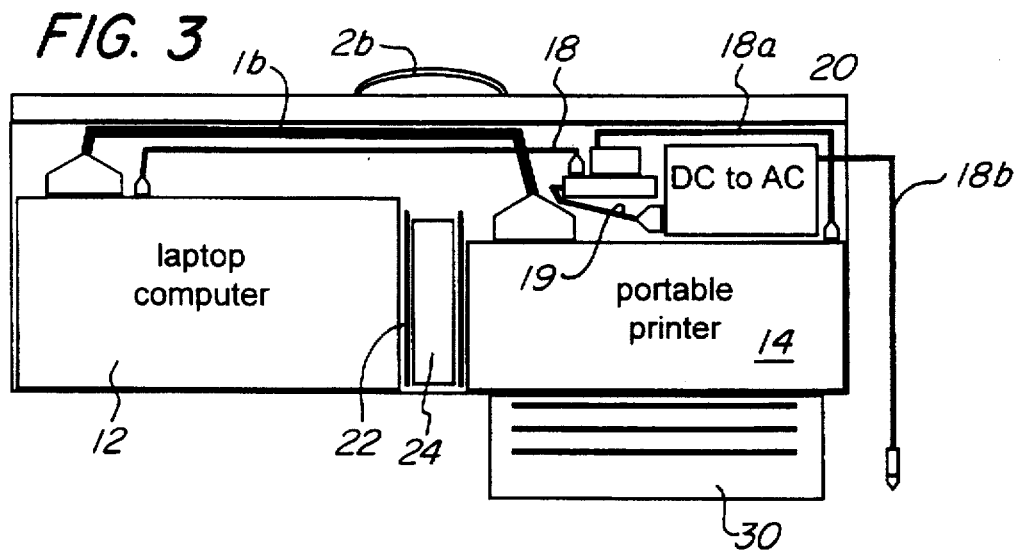

CARRYING CASE FOR A MOBILE OFFICE SYSTEM

This invention relates to a hand carried case for an arrangement including a portable computer, such as a laptop computer, cable connections to and from the various devices in the case, a power cord for an external power source, a DC to AC power converter, as well as self contained battery packs for complete portability of the home office.

Carrying cases have been devised and used in the past for transporting a computer and a printer, such as U.S. Pat. No. 4,837,590 which shows a case having a computer mounted on a platform, with a printer mounted on a second platform in which the second platform has a paper storage area under the platform for tractor fed manifold paper. A disadvantage and drawback of this prior art construction is that the operator or user when sitting in front of the computer and printer array cannot see the printed paper exiting from the printer since the printer is positioned at right angles to the laptop computer. Another disadvantage of the prior art constructions is that although the carrying devices are considered to be mobile offices, they do not have provisions for holding all the accessories required for conducting an office when away from the user's principal office.

It is a further object of the present invention to provide a rectangular-shaped padded carrying case for transporting a mobile office in which the laptop computer and a top-loaded portable printer are positioned side-by-side, with the computer and printer facing forward for maximum visibility.

It is a further feature of the present invention to provide padded separators creating a compartment housing a necessary device such as a paper stapler.

Another object of the present invention is to provide a zippered cover for the carrying case which features on the inside of the cover five separate compartments for printer paper, working files, a calculator compartment, a pen holding section, as well as a data processor for a complete mobile office for transporting to the job site, and either obtaining a power source from an AC outlet or DC power from self contained batteries, in order to complete written job estimates or invoices while at the job site.

A further feature of the present invention is to provide a slot in the front wall of the base of the carrying case for the printed paper exiting from the printer in full view of the operator. The padded carrying case is also provided with a handle for easy portability.

The present invention is especially useful for business people such as painters, cleaners, builders, plumbers, electricians, and outdoor service people, such as landscapers for taking the mobile office to the job site and either obtaining a power source from an AC outlet, or DC power from a vehicle cigarette lighter output, or self-contained batteries, in order to complete job estimates or invoices while at the job site in order to expedite interactions with customers or potential customers.

DESCRIPTION OF THE DRAWING

In order that the present invention will be entirely understood, it will now be described in the accompanying drawings in which:

FIG. 1 is a front elevational view of the carrying case with a mobile computer system constructed in accordance with the teachings of my invention, with the accompanying case in an open position.

FIG. 2 is a front elevational view of the carrying case shown in FIG. 1 but with the case in a closed position.

FIG. 3 is a top plan view of the carrying case with the case in an open position showing the frontal side-by-side orientation of both the laptop computer and the companion portable printer.

DESCRIPTION OF THE PREFERRED EMBODIMENT

Figure 4:
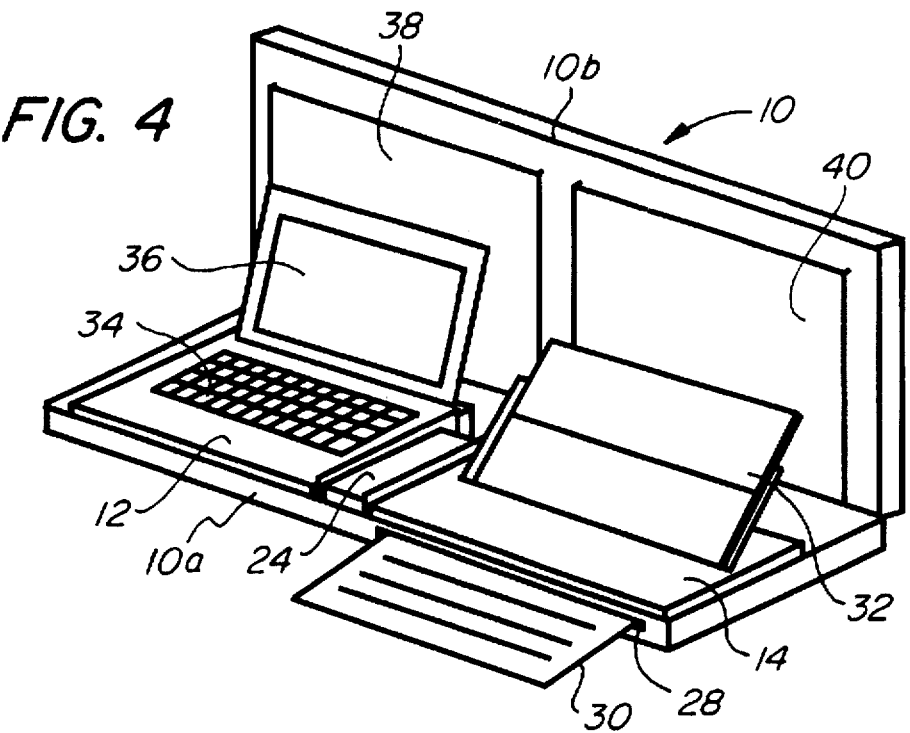
FIG. 4 is a perspective view of the carrying case showing the location of the computer and top loaded printer, and showing the printed paper exiting from the slot in front of the carrying case.

As seen in the figures, the carrying case for a mobile computer system is referred to generally by the reference numeral 10, and as can be observed is rectangular shaped, and is longer than it is wide in order to accommodate a computer, such as a laptop computer 12 and a portable printer 14 in a side-by-side orientation, and both facing forward. The length of the carrying case can be more than twice its width. The case 10 has a base 10a and a hinged lid 10b. As seen in FIG. 3, the hook up connections necessary to operate both computer and printer are located, such as printer cable 16, power lines or cords 18, 18a and 18b, as well as power converter 20 by means of power cord 19. It should be evident that both the computer and printer can derive a power source by being plugged into an AC outlet or a vehicle's cigarette lighter outlet through the DC to AC power converter 20 and power cord 19. The laptop computer and printer can also be operated solely from the carrying case without any external power source by using the laptop's internal battery and a battery attachment 43, as seen in FIG. 5, for the printer.

Referring now to FIG. 3, both computer 12 and printer 14 are located in the padded carrying case 10, but spaced from each other by padded separators 22 forming a compartment to snugly hold a stapler 24 which is often needed when fastening printed papers together. Thus, the laptop computer and printer are separated to avoid damage to either while transporting and at the same time providing a convenient location for an often necessary office article. Both the lid and base can be padded. The case 10 is also provided with a handle 26 for easily transporting the mobile office from one location to another.

The carrying case 10 is provided with an elongated slot 28 which serves as exit location for the paper 30 which has been printed by the portable printer 14. As seen in FIG. 4, the printer 12 has a top loaded paper sheet feeder 32 so that the operator or user of the mobile office can take a position in front of the open case 10 and be able to use the keys of the keyboard 34 while viewing the screen 36 and at the same time view the printed paper 32 exiting from the carrying case 10. Additionally, all the accessories normally used in a business office are available, such as file holding sections 38 and 40, for example for estimating sheets and customer file folders. In addition, pockets 40 and 42 are utilized for holding a calculator, as well as pens and pencils. Of course, a stapler 24 is available in the compartment formed by the padded separators 22.

Figure 5:
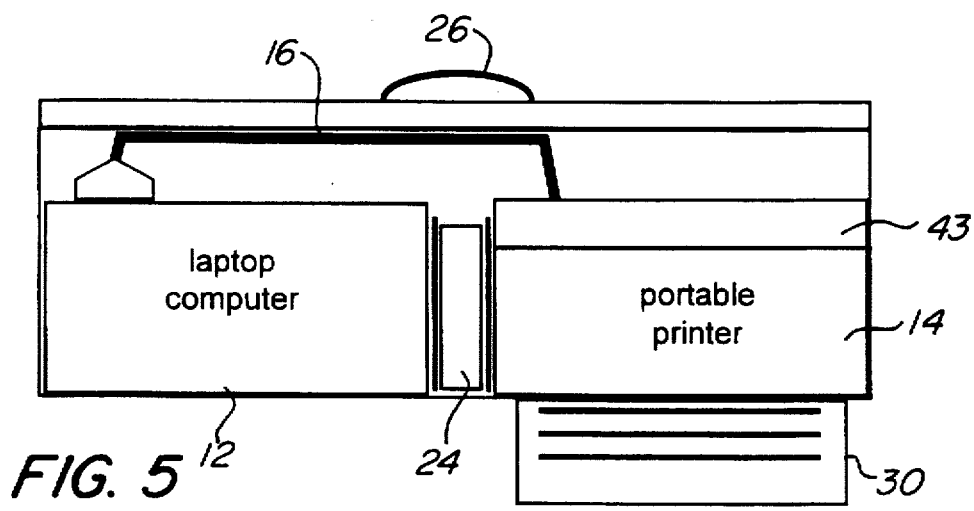
FIG. 5 is a top plan view of the carrying case as shown in FIG. 3 but with the power sources for the computer and printer being battery packs.

FIG. 5 shows my mobile office system in a completely self-sustained mode, in which the computer 12 and printer 14 are activated by battery packs, one being an integral part of the computer, the other 43, a rechargeable battery attachment for the portable printer.

It should be apparent that the carrying case 10 not only transports a laptop computer and a companion portable printer, but also carries the necessary items for providing on the spot written job estimates to potential customers, thus avoiding the usual time delay between the actual viewing and inspection of the job site and the preparation and mailing of a job estimate to a potential customer thus resulting in a more efficient business practice.

Although the present invention has been disclosed and described with reference to a single embodiment of the present invention, it should be apparent that other variations and modifications may be made, and it is intended that the following claims cover said variations within the true spirit of the invention.

What is claimed is:

1. A mobile office system including a carrying case comprising a base and a lid for said base, a portable computer mounted in said base, top loading portable printer mounted in said base spaced from said computer, a compartment formed by separators located in the space between the computer and printer for housing an office accessory, a power source for said computer and printer, connection means for connecting said computer and printer to said power source, and a slot in a front wall of the base of said carrying case for discharging papers printed by said printer.

2. The mobile office system of claim 1 wherein said separator compartment is padded.

3. A mobile office system including a carrying case comprising a base, a portable top loading printer mounted in said base and spaced from a computer, both said computer and printer facing forward in said base in side-by side relationships, at least two separators for forming a separator compartment located in the space between said printer and computer for housing an office accessory, a power source for said computer and printer, and an elongated slot in a front wall of the base of said carrying case for discharging papers printed by the mobile office system facing the computer, printer and printed paper exiting said slot.

4. The mobile office system of claim 1 wherein the length of said case is more than twice the width of said case.

5. The mobile office system of claim 3 further comprising a lid and at least one file holding section and at least one pocket in an inside of the lid of said case, each for holding an office accessory.

6. The mobile office system as claimed in claim 5 wherein said file holding section is for job orders.

7. The mobile office system as claimed in claim 3 wherein said printer is provided with a top loaded paper sheet feeder whereby the sheets of paper when printed are discharged consecutively through the slot in the base of said case.

8. The mobile office system as claimed in claim 1 wherein both said base and lid are padded.

9. The mobile office system of claim 1 wherein said power source for said computer and printer are batteries.

* * * * *